UNITED STATES PATENT OFFICE.

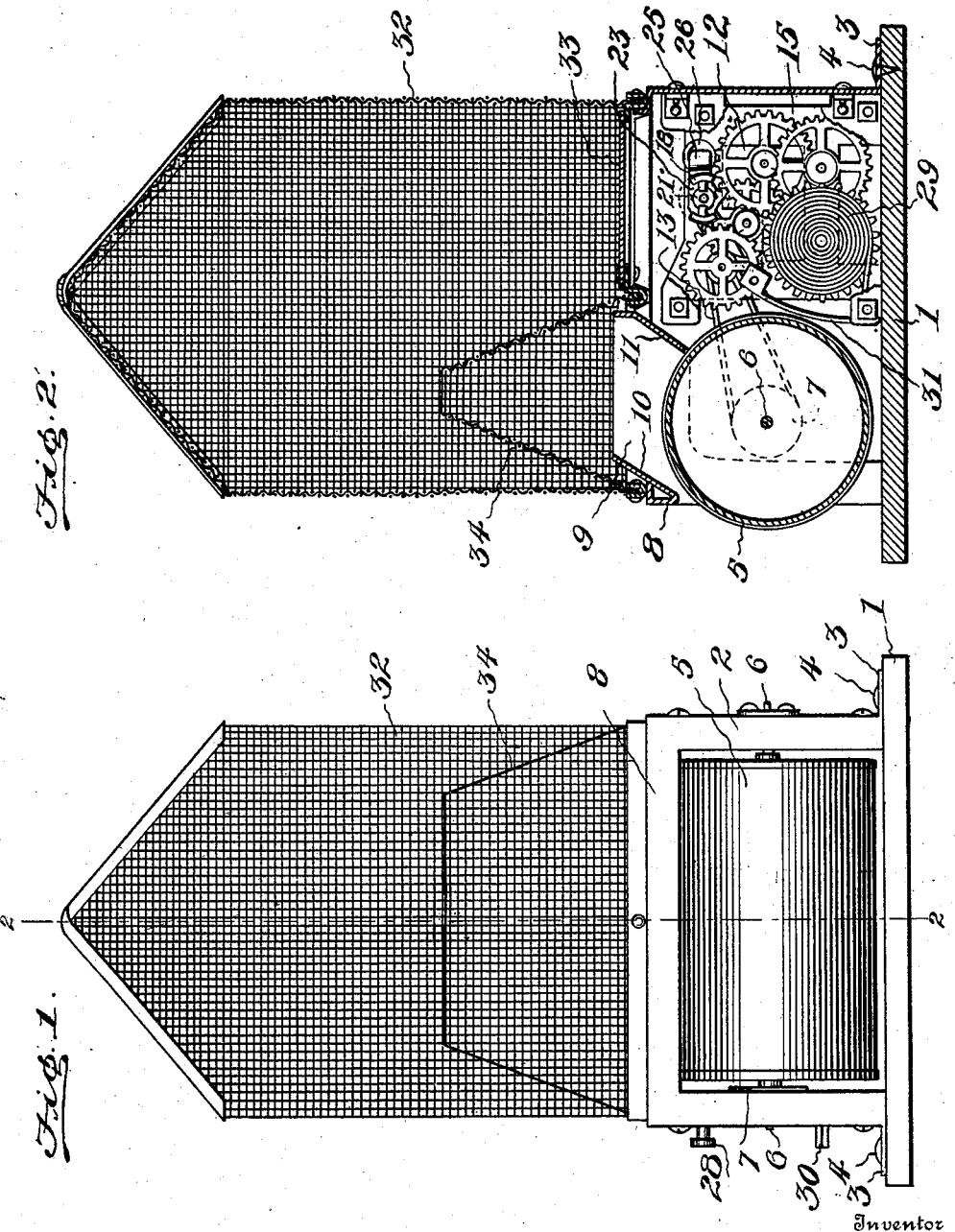

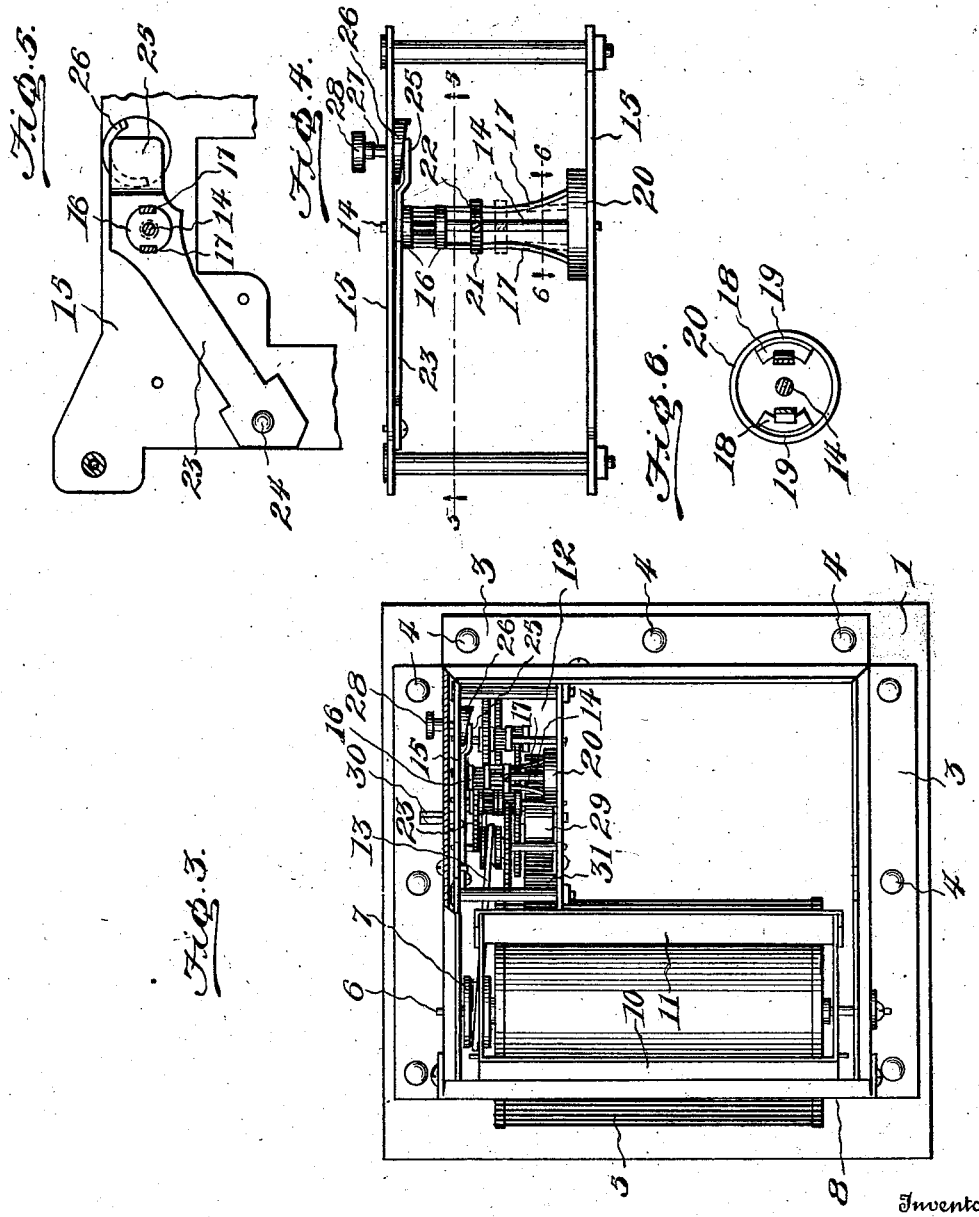

ROBERT L. RAMSEY, OF ENNIS, TEXAS.

FLY-TRAP.

No. 889,635.  Specification of Letters Patent.  Patented June 2, 1908.

Application filed September 17, 1907. Serial No. 393,313.

*To all whom it may concern:*

Be it known that I, ROBERT L. RAMSEY, a citizen of the United States, residing at Ennis, in the county of Ellis and State of Texas, have invented new and useful Improvements in Fly-Traps, of which the following is a specification.

This invention relates to fly traps, of that type comprising a drum or roller for containing bait and adapted to be rotated by a clock movement.

One of the principal objects of the same is to provide means for regulating the speed of the bait drum.

Another object of the same is to provide means for starting and stopping the rotation of the drum.

Still another object is to provide means whereby the trap may be lifted from the operating mechanism to dispose of the flies.

These and other objects may be attained by means of the construction illustrated in the accompanying drawings in which Figure 1 is a front elevation of a fly trap made in accordance with my invention. Fig. 2 is a central vertical section on the line 2—2 of Fig. 1. Fig. 3 is a plan view and partial horizontal section with the trap removed from the casing containing the operating mechanism. Fig. 4 is a plan view of the speed governor. Fig. 5 is a vertical section on the line 5—5 of Fig. 4 looking in the direction indicated by the arrow. Fig. 6 is a vertical section on the line 6—6 of Fig. 4 looking in the direction indicated by the arrow.

Referring to the drawings for a more specific description of my invention the numeral 1 designates the base to which is secured a skeleton frame 2, said frame having outwardly bent flanges 3 secured to the base 1 by means of suitable fastenings 4. Journaled in the sides of the frame 2 is a drum 5 and upon the shaft 6 of said drum is a grooved pulley 7. The drum 5 projects slightly beyond the frame 2 in the front and the upper portion of the frame 2 is spaced a sufficient distance from the periphery of the drum to permit flies to pass under the front cross bar 8. A portion of the frame 2 is bent up to form an inlet chamber 9, the front wall 10 of which inclines rearwardly while the rear wall 11 inclines forwardly, said rear wall terminating at a point adjacent to the periphery of the drum 5 so as to prevent flies from getting under said wall. The drum 5 is adapted to carry a suitable bait consisting of syrup or other alluring material. A suitable clock movement 12 is supported upon the base 1 within the frame 2 and a cord or belt 13 passes around the grooved pulley 7 on the drum shaft and around a similar pulley on one of the shafts of the clock movement.

To control and govern the speed of rotation of the drum 5, the device illustrated in Figs. 4, 5 and 6 is utilized said device consisting of a shaft 14 journaled in the clock frame 15. Connected to said shaft by means of the disks 16 is a pair of spring brake arms 17 having secured to their outer ends curved brake shoes 18, said brake shoes being provided with frictional surfaces 19 formed of leather or other suitable material. A ring 20 secured to the frame bar 15 of the clock movement receives the brake shoes 18 with their surfaces 19 bearing against the inner surface of said ring. To regulate the friction of the shoes against the ring a sliding collar 21 is provided, said collar inclosing the spring arms 17 and when moved upon the shaft 14 regulates the friction of the shoes 18 against the ring 20, said collar having a set screw 22 for securing the same in adjusted position.

A starting and stopping device is provided and consists of the spring arm 23 secured to the frame 15 by means of a rivet 24, said arm having a hole therein through which the shaft 14 passes, said arm being disposed between the disk 16 and the frame 15 and provided at its outer end with a bearing lug 25. A cam 26 mounted upon a stem 27 is provided with a milled head 28, by turning which the cam 26 bears against the lug 25 to press the arm 23 against the disk 16 to stop the clock movement, as will be understood. The spring 29 of the clock movement is wound by means of a key fitted to the squared shaft 30 and in order to prevent the spring 29 when unwound from coming in contact with the drum 5 a guard 31 is provided, said guard being secured to the frame in front of the spring 29.

The trap consists of a wire cloth housing 32 provided with a hinged bottom 33 and an interior wire cloth baffle 34 the sides of which converge toward the top and provide a comparatively narrow opening at the upper end thereof which communicates with the trap or housing 32. The trap or housing 32 is supported upon suitable flanges formed upon the frame 2.

The operation of my invention may be briefly described as follows: The drum 5 having been properly baited and the spring 29 having been wound by the key fitted to the squared shaft 30, the speed of the drum 5 may be regulated by the brake shoes 18 and the adjustable collar 21. Whenever it is desired to start or stop the mechanism the milled wheel 25 is actuated as will be understood. Whenever it is required to dispose of the flies caught the trap or housing 32 is removed and the door 33 may be opened.

From the foregoing it will be obvious that a fly trap made in accordance with my invention is of simple construction, will operate efficiently, means being provided to regulate the speed of rotation of the bait drum or cylinder and simple and efficient means being provided for starting and stopping the rotation of the drum.

Having thus fully described the invention what is claimed as new is:

1. A fly trap comprising a frame, a bait drum journaled therein, an inlet chamber above the bait drum, a wire cloth baffle supported upon the frame above the drum and provided with converging walls, spring-actuated mechanism for rotating the drum, a governor for regulating the speed of rotation of the drum, and a lever and cam for starting and stopping said mechanism.

2. In a fly trap, a bait drum, spring actuated mechanism for rotating said drum, means for regulating the speed of said drum, a start and stop lever, a cam for actuating said lever and a fly trap mounted upon the frame above the drum and provided with a baffle and a hinged door.

In testimony whereof I affix my signature in presence of two witnesses.

ROBERT L. RAMSEY.

Witnesses:
J. R. BALDRIDGE,
G. W. HENRY.